2,610,908

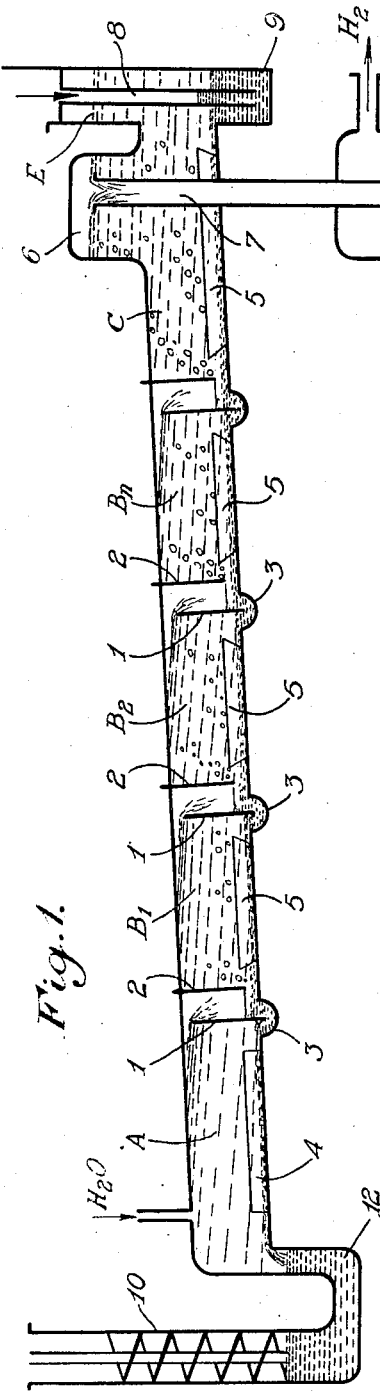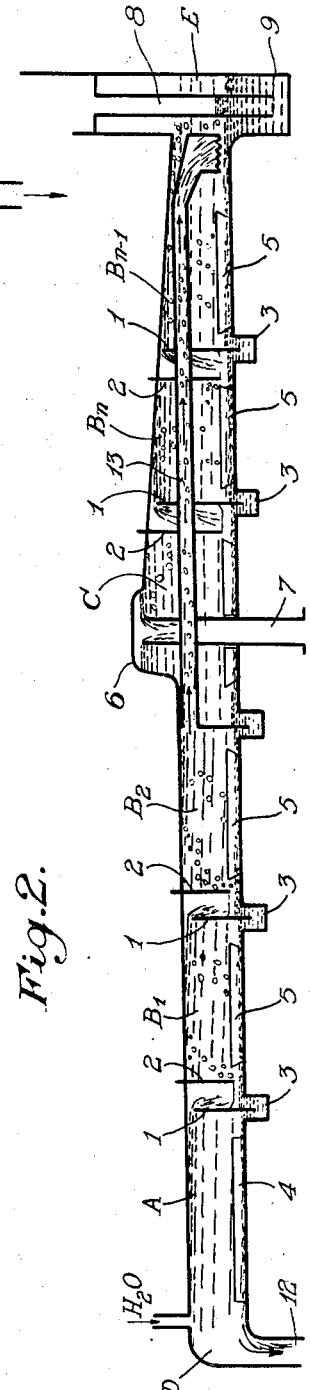
INVENTORS
Charles Deprez
Alexis Basilewsky
By Robert E. Burns
ATTORNEY Patented Sept. 16, 1952

UNITED STATES PATENT OFFICE 2,610,908

PROCESS OF AND APPARATUS FOR PRODUCING CAUSTIC SOLUTIONS OF HIGH CONCENTRATION

Charles Deprez, Uccle-Brussels, and Alexis Basilewsky, Bortsfort-Brussels, Belgium, assignors to Solvay & Cie, Ixelles-Brussels, Belgium, a Belgian company Application March 5, 1947, Serial No. 732,572
In Belgium March 9, 1946

4 Claims. (Cl. 23—184)

This invention relates to process and apparatus for the decomposition of alkali amalgams with production of caustic liquors highly concentrated in alkali hydroxides. It is known that the satisfactory operation of these devices depends, among other factors, on the temperature conditions; the heat evolved by the reaction is, for the greater part, absorbed by the mercury and in the usual type of apparatus it is not well utilised.

A judicious utilization of this heat is obtained with the process and apparatus as described in Belgian Patent No. 454,461, dated February 18, 1944, in which heat is removed from the mercury by vaporising part of the water present and condensing the resulting steam in the more highly concentrated liquor, thereby raising the temperature of the latter and promoting the decomposition of the amalgam. The operation is carried out in a cell divided into compartments: a portion of the least concentrated solution is first vaporised, then the vapour produced is condensed in a compartment containing more highly concentrated solution, the temperature of which is raised until it vaporises; the vapour thus produced at higher temperature is condensed in turn in a compartment where the hydroxide concentration is still higher, and so on up to the compartment for the finished product where the temperature is highest.

The present invention has for its object to further improve said process and to render the same applicable to so-called horizontal cells, the term "horizontal" being understood to mean "slightly inclined" in opposition to vertical or upward cells.

According to our invention the liquor is led through the compartments of a horizontal cell and is caused to follow the upper wall of each compartment over the greater part of its length, the passageway from one compartment to the next being restricted so that in addition to the liquor, only amounts of vapour and hydrogen substantially equal to the amounts produced are allowed to pass, and said vapour and gas are caused to enter the next compartment at the bottom thereof and to bubble through the liquor, whereby the whole of the heat evolved or recovered in one cell passes into the next compartment. To this end, the successive compartments are separated from one another by two cross partitions, one forming an overflow and the other a liquid seal for the solution.

In order that the invention may be more clearly understood we shall describe by way of example two embodiments thereof with reference to the accompanying drawings in which:

Fig. 1 diagrammatically illustrates in sectional side elevation a horizontal cell according to our invention.

Fig. 2 likewise illustrates a modified cell according to our invention.

In the example illustrated in Fig. 1, the horizontal cell provided with the usual heat insulated walls is divided into a plurality of compartments A, B, ... $B_n$, C, each of which may be built as a separate section and then connected with the others. Each compartment is separated from the next one by two cross partitions, one partition 1 operating as an overflow for the solution of alkali hydroxide and projecting downwardly into a depression 3 in which the amalgam forms a liquid seal, the other partition 2 forming a gas trap and projecting downwardly into the solution to a small distance above the level of the amalgam.

Water is introduced into compartment A which is provided with heat exchange ribs 4 of extensive surface, which are secured to the bottom of the apparatus and are licked by the aqueous solution. The other compartments have a flat bottom on which are applied grids 5 in a known manner, in order to promote decomposition of the amalgam. The last compartment C is provided with a gas delivery dome 6 and an outlet tube 7 for the gas and the finished solution. The cell is closed at both ends by parts forming liquid seals, one D for letting out the mercury, the other E for letting in the amalgam. The grids 5 are made of graphite and are strongly pressed against the flat amalgamated bottom of the cell.

The amalgam is supplied to the head E of the apparatus through a tube 8 dipping in the liquid seal 9; it overflows, in form of a thin sheet spread over the amalgamated cell bottom, and flows from one compartment to the next, licking the grids 5 and passing under the partitions 1 through the depressions 3. When it has been practically decomposed, it reaches the last compartment A which, as previously stated, has no grid but heat exchange ribs or plates secured to the bottom. Thence the mercury free from alkali forms the liquid seal 12 and is removed by an elevator 10 to the electrolytic cell.

The water necessary for forming the caustic solution follows an opposite course, being admitted to compartment A where it washes the mercury and absorbs from the ribs 4 a substantial part of the heat contained therein. A portion of the water is vaporised. The water-vapour mixture flows towards the partition 1 and over the same into the space comprised between partitions 1 and 2, and enters the compartment B through the restricted space under partition 2. The vapour condenses in the liquid in B until this liquid in turn evolves vapour, this occurring at a temperature higher than in compartment A since the concentration in B is higher. This operation is repeated as the solution proceeds from one compartment to the next and the maximum temperature is reached.

The process is preferably carried out under such conditions that the gas chambers above the solution are practically reduced to nil. To this end the partitions 1 are carried to such height that the solution is in contact with the top wall of the cell over the greater part thereof, and the passageway between the top wall and the partition 1 is reduced to the opening just necessary to allow passage of the caustic solution and of the water vapour and hydrogen produced. In this way the whole of the heat evolved or recovered in a compartment such as $B_1$ passes into the next compartment $B_2$ owing to the fact that the vapour and hydrogen have to bubble through the solution in $B_2$; the hydrogen having previously yielded part of its heat to the solution in $B_1$ since it had in the form of bubbles a prolonged contact with the latter solution on account of the absence of a gas chamber. Without the arrangement as described the hydrogen and water vapour would leave the cell carrying their own heat at the expense of the output of the cell. This arrangement moreover results in energetically stirring the liquor in each compartment, thus creating conditions favourable to a better heat exchange with and a quicker decomposition of the amalgam.

The hydrogen evolved in the successive compartments accumulates in the dome of section C and flows with the solution through pipe 7 into a separator 11 of known type.

The apparatus also comprises vapour inlets (not shown) in the chambers between partitions 1 and 2 and in the liquid seals 3, 9, 12, their purpose being chiefly to blow steam to clean and remove occasional obstructions produced by the amalgam.

The cell as described may be used for decomposing amalgam supplied by a plurality of electrolytic cells; valves for stopping the supply of mercury then being provided in a known manner in order to avoid short-circuiting the cells.

The operation of the apparatus described is methodical since the amalgam and the solution flow in opposite directions. This is of advantage when the amalgam produced in the electrolytic cell enters the apparatus at a high temperature. In the general case where the average range of temperatures is lower in the electrolytic cell than in the decomposition cell, it may be advantageous to introduce the amalgam no longer into the solution outlet compartment, but into another compartment of lower temperature. Two decomposition cells as described then may be connected in series; one in which the amalgam and the solution flow in the same direction, the second in which they flow in opposite directions.

A preferred arrangement, as regards the operation, consists in combining both cells into a single apparatus as shown by way of example in Fig. 2. Taking the apparatus of Fig. 1, a portion thereof comprising the compartments ... $B_{n-1}$, $B_n$, C is inverted and the solution is led directly from $B_2$ to E near the amalgam inlet through an inner or outer pipe 13. This pipe 13 also conveys the water vapour and the hydrogen evolved in the compartments A, $B_1$, $B_2$ and feeds them into the compartment E through a perforated down-turned distributor. In order to provide a contact between the solution and the top wall of the cell over a surface as large as possible, the top wall as shown is inclined at an angle opposite to the angle of the bottom with respect to the horizontal. Thus, as shown in Fig. 2, wherein the inlets and outlets for the materials handled are designated by the same reference numbers used in Fig. 1 and employed in the foregoing description of the process of the invention, and wherein the flow of materials is shown by arrows and appropriate legends, the amalgam and the alkali metal hydroxide solution formed by the reaction of water with the amalgam, are in contact in an area of counter-current flow and are in contact in an area of co-current flow. Thus, referring to Fig. 2, the amalgam to be treated is introduced through tube 8, dipping into a liquid seal 9. Water is supplied through the water inlet designated "$H_2O$." In the left-hand portion of the apparatus in Fig. 2, the amalgam flows to the left and the alkali metal hydroxide above the amalgam flows to the right. Thus, these two materials flow counter-currently. In the right-hand portion of the apparatus of Fig. 2, the amalgam flows to the left and the alkali metal hydroxide also flows to the left, i. e. in co-current flow. From the end of the area of counter-current flow which is opposite the end into which the water is introduced the alkali metal hydroxide is carried through the pipe 13 in the direction of the arrows to the end of the area of co-current flow at which the fresh amalgam is introduced. At the opposite end of the area of co-current flow, the alkali metal hydroxide solution is removed through outlet pipe 7 and the amalgam, which is partially denuded at this point by reason of the previous contact with the alkali metal hydroxide solution, passes into the portion of the apparatus in which there is counter-current flow and finally passes out of the apparatus through outlet 12 as indicated by the arrow in Fig. 2 at the end at which water is introduced. It will be seen by reference to Fig. 2 that the alkali metal hydroxide solution flows unidirectionally toward the right in the area of counter-current flow (left-hand portion of Fig. 2) and that the alkali metal hydroxide solution flows unidirectionally toward the left in the area of co-current flow (right-hand portion of Fig. 2). Further, it will be seen that the vapors and the liquid are both caused to flow unidirectionally and that the vapors from one body of alkali metal hydroxide solution are caused to pass through the adjacent body of alkali metal hydroxide solution, as previously pointed out in connection with the description of Fig. 1. By reason of the continuous contact with richer amalgam in passing through the apparatus the alkali metal hydroxide solution increases in concentration in the direction of flow of the solution. Thus, in Fig. 2, the alkali metal hydroxide solution increases in concentration from left to right in the left-hand portion of Fig. 2 and from right to left in the right-hand portion of Fig. 2.

It will be understood that the invention is not limited to the constructional details herein shown and described, but it may be modified within the scope of the appended claims as by making the compartments in the form of separate receptacles.

We claim:

1. In an apparatus for the decomposition of alkali metal amalgam by water, in combination, an elongated substantially horizontal trough, means defining a confined area adapted for counter-current material flow in said trough, means defining a confined area of co-current material flow in said trough, said trough having a sloping bottom, a top, and side walls, a water inlet and a mercury outlet at one end of said area of counter-current flow, an amalgam inlet at one end of said area of co-current flow and a solution outlet at the other end of said area of co-current flow, the top of said trough adjacent said mercury outlet being substantially parallel to said sloped bottom, and the bottom and top of said trough adjacent said amalgam inlet converging toward said amalgam inlet, partition means between said area of counter-current flow and said area of co-current flow and conduit means extending from the upper portion of said area of counter-current flow to the portion of said area of co-current flow adjacent said amalgam inlet for conducting fluids from said area of counter-current flow to said area of co-current flow.

2. In an apparatus for the decomposition of alkali metal amalgam by water, in combination, an elongated substantially horizontal trough, means defining a confined area adapted for counter-current material flow in said trough, means defining a confined area of co-current material flow in said trough, said trough having a sloping bottom, a top, and side walls, a water inlet and a mercury outlet at one end of said area of counter-current flow, an amalgam inlet at one end of said area of co-current flow, and a solution outlet at the other end of said area of co-current flow, the top of said trough adjacent said mercury outlet being substantially parallel to said sloped bottom, and the bottom and top of said trough adjacent said amalgam inlet converging toward said amalgam inlet, partition means between said area of counter-current flow and said area of co-current flow, said amalgam inlet means and said solution outlet means being at opposite ends of said area of co-current flow, said solution outlet means being adjacent said partition means separating said area of counter-current flow from said area of co-current flow, and conduit means extending from the upper portion of said area of counter-current flow to the portion of said area of co-current flow adjacent said amalgam inlet for conducting fluids from said area of counter-current flow to said area of co-current flow.

3. A process of producing alkali metal hydroxide solutions of high concentration by decomposing the corresponding alkali metal amalgams which comprises, establishing a plurality of substantially-horizontal confined reaction zones containing alkali metal hydroxide solution, the solution in each of said zones increasing in alkali metal hydroxide concentration at a first end of least concentration to a zone of highest concentration, said zones defining a confined area of counter-current flow including said zone of least concentration and a confined area of co-current flow including said zone of highest concentration, introducing water into said zone of least alkali metal hydroxide concentration at a first end of said area of counter-current flow, introducing alkali metal amalgam into a first end of said area of co-current flow, flowing said amalgam unidirectionally from said first end of said area of co-current flow to the second end of said area of co-current flow, introducing alkali metal amalgam from said second end of said area of co-current flow into the second end of said area of counter-current flow, flowing said amalgam unidirectionally from said second end to said first end of said area of counter-current flow, and flowing alkali metal hydroxide solution and vapors, including water vapor generated therein, unidirectionally from said first end to said second end of said area of counter-current flow, whereby said amalgam flows counter-currently to said solution and said vapors throughout said area of counter-current flow, transferring alkali metal hydroxide solution and vapors, including water vapor generated therein, through a confined transport zone from said second end of said area of counter-current flow to said first end of said area of co-current flow, the solution and vapors in said area of counter-current flow being otherwise isolated from said area of co-current flow, flowing alkali metal hydroxide solution and vapors, including water vapor generated therein, unidirectionally from said first end to said second end of said area of co-current flow, whereby the amalgam introduced into said first end of said area co-current flow flows co-currently to said solution and said vapors throughout said area of co-current flow, withdrawing alkali metal hydroxide solution from said zone of highest concentration at said second end of said zone of co-current flow, said alkali metal hydroxide solution and said vapors, including water vapor, being introduced from each of said zones into the next zone of higher concentration into the lower portion thereof, whereby the vapors passing to said zone of higher concentration are caused to pass through the solution in said zone and the water vapors to condense therein.

4. A process of producing alkali metal hydroxide solutions of high concentration by decomposing the corresponding alkali metal amalgams which comprises, establishing a plurality of substantially-horizontal confined reaction zones containing alkali metal hydroxde solution, the solution in each of said zones increasing in alkali metal hydroxide concentration from a zone of least concentration to a zone of highest concentration, said zones defining a confined area of counter-current flow including said zone of least concentration and a confined area of co-current flow including said zone of highest concentration, introducing water into said zone of least alkali metal hydroxide concentration at a first end of said area of counter-current flow, introducing alkali metal amalgam into a first end of said area of co-current flow, flowing said amalgam unidirectionally from said first end of said area of co-current flow to the second end of said area of co-current flow, introducing alkali metal amalgam from said second end of said area of co-current flow into the second end of said area of counter-current flow, flowing said amalgam unidirectionally from said second end to said first end of said area of counter-current flow, and flowing alkali metal hydroxide solution and vapors, including water vapor generated therein, unidirectionally from said first end to said second end of said area of counter-current flow, whereby said amalgam flows counter-currently to said solution and said vapors throughout said area of counter-current flow, transferring alkali metal hydroxide solution and vapors, including water vapor generated therein, through a confined transport zone from said second end of said area of counter-current flow to said first end of said area of co-current flow, the solution and vapors in said area of counter-current flow being otherwise isolated from said area of co-current flow, flowing alkali metal hydroxide solution and vapors, including water vapor generated therein, unidirectionally from said first end to said second end of said area of co-current flow, whereby the amalgam introduced into said first end of said area of co-current flow flows co-currently to said solution and said vapors throughout said area of co-current flow, withdrawing alkali metal hydroxide solution from said zone of highest concentration at said second end of said zone of co-current flow, said alkali metal hydroxde solution and said vapors, including water vapor from each of said zones being caused to follow the upper portion of the zone over the greater part of its length, being removed from adjacent the top of one zone and being introduced from each of said zones into the next zone of higher concentration into the lower portion thereof, whereby the vapors passing to said zone of higher concentration are caused to pass through the solution in said zone and the water vapor to condense therein.

CHARLES DEPREZ.
ALEXIS BASILEWSKY.

REFERENCES CITED

The following references are of record in the file of this patent:

UNITED STATES PATENTS

| Number | Name | Date |
|---|---|---|
| 679,355 | Barr | July 30, 1901 |
| 728,746 | McCaffrey | May 19, 1903 |
| 908,545 | Carrier | Jan. 5, 1909 |
| 930,909 | Wiegand | Aug. 10, 1909 |
| 1,121,532 | Newberry | Dec. 15, 1914 |
| 1,753,015 | McGregor | Apr. 1, 1930 |
| 2,083,648 | Gorke | June 5, 1937 |
| 2,392,236 | Edwards | Jan. 1, 1946 |

FOREIGN PATENTS

| Number | Country | Date |
|---|---|---|
| 4,448 | Great Britain | 1874 |
| 17,169 | Great Britain | 1892 |
| 10,352 | Great Britain | 1909 |
| 453,517 | Great Britain | 1936 |
| 615,523 | Germany | 1935 |
| 643,157 | Germany | Mar. 10, 1937 |
| 136,763 | Switzerland | 1930 |